United States Patent
Wheeler et al.

(10) Patent No.: US 7,723,672 B1
(45) Date of Patent: May 25, 2010

(54) MULTI-POSITION KINEMATIC MOUNT FOR OPTICAL SENSORS IN STABILIZED PLATFORMS

(75) Inventors: Craig S. Wheeler, Santa Rosa, CA (US); Rick Baldomero, Cloverdale, CA (US)

(73) Assignee: L-3 Communications Sonoma EO, Inc., Santa Rosa, CA (US)

( * ) Notice: Subject to any disclaimer, the term of this patent is extended or adjusted under 35 U.S.C. 154(b) by 519 days.

(21) Appl. No.: 11/677,929

(22) Filed: Feb. 22, 2007

(51) Int. Cl.
*H01J 40/14* (2006.01)
*H01J 5/02* (2006.01)

(52) U.S. Cl. ..................... 250/239; 409/133

(58) Field of Classification Search ............... 250/239; 409/133

See application file for complete search history.

(56) References Cited

U.S. PATENT DOCUMENTS 5,354,157 A * 10/1994 Wells et al. ............. 409/133

* cited by examiner

*Primary Examiner*—Seung C Sohn
(74) *Attorney, Agent, or Firm*—Mark J. Danielson; Pillsbury Winthrop Shaw Pittman LLP

(57) ABSTRACT

The present invention provides a high dynamic performance mounting technique that is suitable for mounting sensor elements in adverse environments. According to one aspect, the present invention includes a kinematic mounting technique for a movable secondary mirror in an optical sensor. According to another aspect, the invention includes a mounting structure that provides deterministic alignment of a sensor element over multiple positions. According to another aspect, the invention includes a mounting technique with high dynamic performance yet minimizes sensor obscuration. According to another aspect, the invention includes a mounting technique that decouples actuator stiffness and mounting accuracy from the overall dynamic stiffness and alignment accuracy of a movable secondary mirror in an optical sensor.

18 Claims, 6 Drawing Sheets

MULTI-POSITION KINEMATIC MOUNT FOR OPTICAL SENSORS IN STABILIZED PLATFORMS

FIELD OF THE INVENTION

The present invention relates to optical systems, and more particularly to structural mounts for payloads such as optical sensors in stabilized platforms.

BACKGROUND OF THE INVENTION

In mounts for optical systems, it is often desirable to observe basic principles of kinematics. A body in space, such as a lens or mirror, has six degrees of freedom or ways in which it may move: translation along the three rectangular coordinate axes, and rotation about these three axes. A body is fully constrained when each of these possible movements is singly prevented from occurring. However, it is sometimes desirable in an optical system for some degrees of freedom to be allowed, and so semikinematic methods can be used.

Meanwhile, locating an optical element and maintaining its position relative to other optical elements in an optical system is difficult. Moving an optical element from one position to another and reestablishing alignment is extremely difficult especially over adverse environmental conditions. More particularly, for benign environments like a laboratory or medical facility, it is more straightforward to position an optical element like a secondary mirror accurately. Since there is no external environmental input like vibration shaking the structure, the optical alignment is maintained. In contrast, for optical sensors subjected to adverse environmental conditions like shock and vibration, conventional techniques for holding and positioning an optical element can limit the optical performance of the sensor. When subjected to vibration, like the turbulence from an aircraft, if the structure holding the optical elements is not rigid, it will oscillate at a characteristic amplitude and frequency, and the optical image will blur due to motion of the optics. A key performance specification for optical sensors subjected to environmental disturbances is line of sight (LOS) stability. Line of sight stability is proportional to optical blur. For an optical element that must be moved into different positions, the structure and positioning features must be very stiff and/or deterministic to prevent energy from the environment from disturbing the position of the optical elements.

FIGS. 1A and 1B illustrate an example of a prior art technique for holding and positioning an optical element in a stabilized platform.

As shown in FIG. 1A, an optical element 102 is mounted to a structural arm 104 that pivots on hinges. The structural arm 104 is actuated by a motor (not shown). To minimize optical obscuration, the size of the arm is minimized. As shown in more detail in FIG. 1B, arm 104 is rotated about hinges 106 consisting of ball bearings or bushings and a shaft. Arm 104 might be positioned using an encoder or potentiometer. Hard stops can be used to determine the final position of the arm and hold it in place.

Prior art techniques such as that illustrated in FIGS. 1A and 1B suffer from many problems. Hinges made from bearings or bushings have limited overall stiffness and will limit the dynamic response of the optical system. The relatively narrow shafts that ride in the bearings also have limited stiffness. While the structure that mounts the optics can be very stiff, the hinge/bearing structure limits the overall stiffness of the assembly. Stops used to position the structural element at the end of travel typically can not restrain all six degrees of freedom. The final position of the optical element is indeterminate at best and has limited stiffness.

High performance optical assemblies for use in stabilized platforms that do not limit the imaging performance of the sensor thus remain a highly desirable need in the art.

SUMMARY OF THE INVENTION

The present invention provides a high dynamic performance mounting technique that is suitable for mounting sensor elements in adverse environments. According to one aspect, the present invention includes a kinematic mounting technique for a movable secondary mirror in an optical sensor. According to another aspect, the invention includes a mounting structure that provides deterministic alignment of a sensor element over multiple positions. According to another aspect, the invention includes a mounting technique with high dynamic performance yet minimizes sensor obscuration. According to another aspect, the invention includes a mounting technique that decouples actuator stiffness and mounting accuracy from the overall dynamic stiffness and alignment accuracy of a movable secondary mirror in an optical sensor.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to general aspects, the invention provides a kinematic mounting technique for a movable optical element that allows deterministic alignment over multiple positions with excellent dynamic performance.

FIGS. 2A to 2D illustrate certain general aspects of the invention. It should be noted that these figures are not necessarily to scale and do not indicate any preferred shape, construction, size, inclusion with or without other components, or layout. Accordingly, it should be apparent that these drawings are intended for illustration rather than limitation.

Figure 2A:
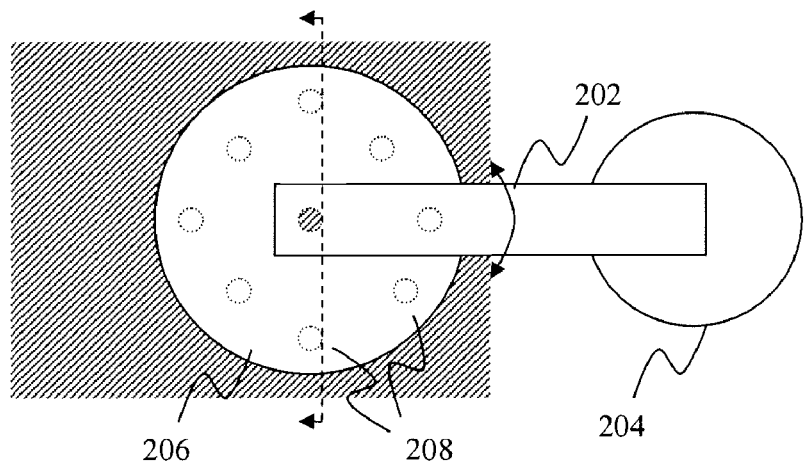
FIGS. 2A to 2D illustrate a kinematic positioning technique according to certain aspects of the invention.

As shown in FIG. 2A, a mounting structure according to this example includes a rigid arm 202 to which is attached an optical element 204. Rigid arm 202 is fixedly attached to mounting assembly 206. Mounting assembly 206 includes mating kinematic features 208. As will be explained in more detail below, mating kinematic features 208 allow the rigid arm 202, and thus optical element 204, to be secured in predetermined and pre-aligned positions.

Figure 2B:
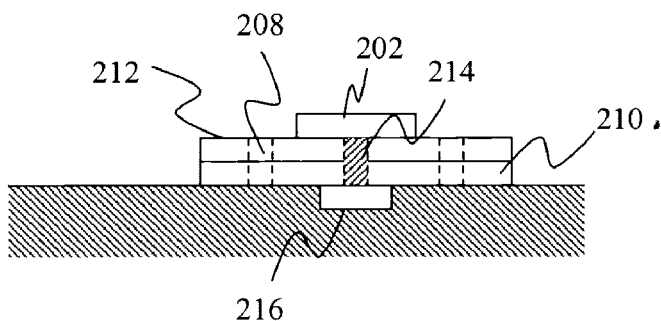

FIG. 2B is a side view of the assembly 206 taken along the sectional line in FIG. 2A. As shown in FIG. 2B, assembly 206 includes a housing plate 210 and a mounting plate 212. In general, housing plate 210 is mounted to a structure such as a sensor platform in or on a vehicle, and mounting plate 212 couples to optical element 204. The mounting plate 212 typically remains coupled to housing plate 210 by mating kinematic features 208, but is allowed to rotate about axis 214 between mating kinematic features 208 when, for example, the optical element 204 is to be repositioned as will be explained further below. Arm 202 and plates 210 and 212 are all preferably comprised of materials such as aluminum.

Figure 2C:
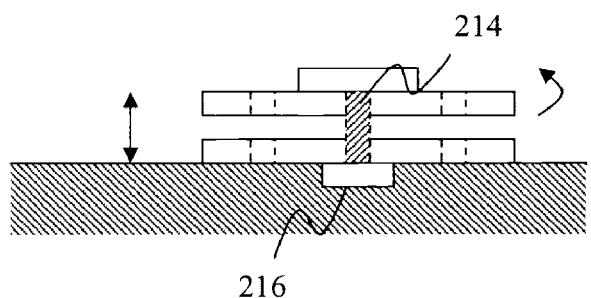
Figure 2D:
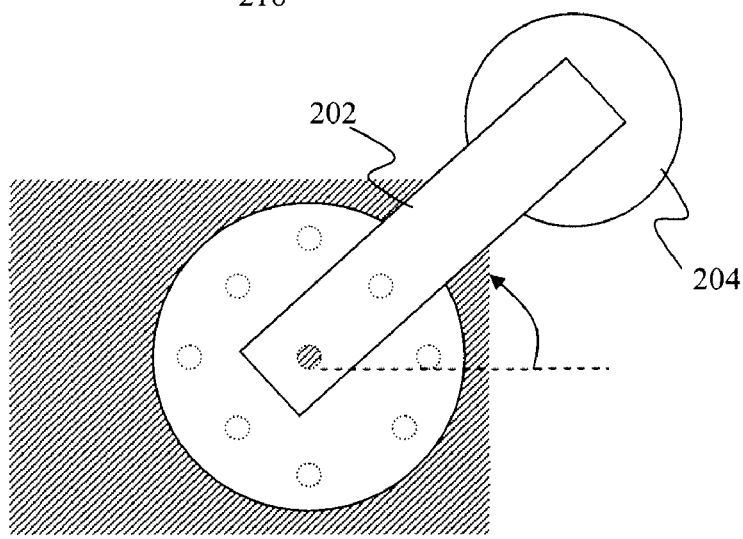

As further shown, assembly 206 includes an actuator 216. Actuator 216 controllably holds together, releases and provides relative rotation between plates 210 and 212. This is illustrated further in FIG. 2C. As shown in FIG. 2C, when the optical element 204 is to be repositioned, the actuator 216 releases plate 210 from plate 212 so that they can separate from each other and mating kinematic features 208 can be disengaged. For example, actuator 216 can include a motor, solenoid or similar mechanism to drive a shaft concentric with axis 214 to move plates 210 and 212 apart. The actuator 216 can then cause the plate 210 to rotate about axis 214 relative to plate 212 until the desired predetermined position is reached, for example using a motor that rotates a shaft concentric with axis 214. Then the actuator 216 brings the plates 210 and 212 together so that the respective mating kinematic features 208 can engage with each other. For example, a motor, solenoid or other similar mechanism can be disengaged by actuator 216 so as to allow a shaft concentric with axis 214 to withdraw. Springs or similar mechanisms within axis 214 can further cause the plates 210 and 212 to be moved together.

It should be apparent that mating kinematic features 208 should be formed symmetrically in respective plates 210 and 212 about axis 214 so that any pair from the two plates can engage with each other. Features 208 can include various types of mechanisms and structures such as mutually engaging posts/grooves, magnets, solenoid-driven posts, etc. The types of structures and mechanisms implemented for features 208 may or may not depend on the type of mechanisms and structures implemented for actuator 216, as will be understood by those skilled in the art.

An advantage of the invention is that the mating kinematic features deterministically position the moveable arm 202 and thus optical element 204 to pre-aligned positions in an optical system. This is illustrated further in FIG. 2D. As shown, when the actuator rotates plates 210 and 212 relative to each other, the plates must be positioned to an alternative set of mating kinematic features 208 or returned to the original arm 202—and thus optical element 204—position. Given that the original mating kinematic features have only one possible mated position, the arm 202 and optical element 204, return to the exact prealigned location.

Another advantage of the invention is that the mating kinematic features can be separated by a larger distance on the housing plate 210 (affixed to a structure) and mounting plate 212 (affixed to the optical element). Conventional techniques like that shown in FIG. 1 react all loads against the rotational axis of the hinge and thus the stiffness of the hinge limits the overall stiffness of the optical system. The invention spreads the load to three separated kinematic locations and decouples the stiffness of the structure from the stiffness of the actuator elements. The housing plate 210, either integral to the structure or affixed to the structure, can be extremely stiff. The broad spacing of the kinematic mates integrated with stiff mounting structures reduces distortion due to stresses and significantly improves dynamic performance of the optical system.

Another advantage of the invention, which should become more apparent from further descriptions below, is that the actuation scheme can be sufficiently decoupled from the rigid arm 202, the housing plate 210, and mounting plate 212 such that the overall stiffness of the arm is not dependent on the stiffness of the actuator. Moreover, the position of the arm and the actuator position or actuation accuracy are sufficiently decoupled, allowing the kinematic mating features to deterministically engage regardless of variations in the mounted position of the actuator or variations in actuation accuracy.

Figure 1A:
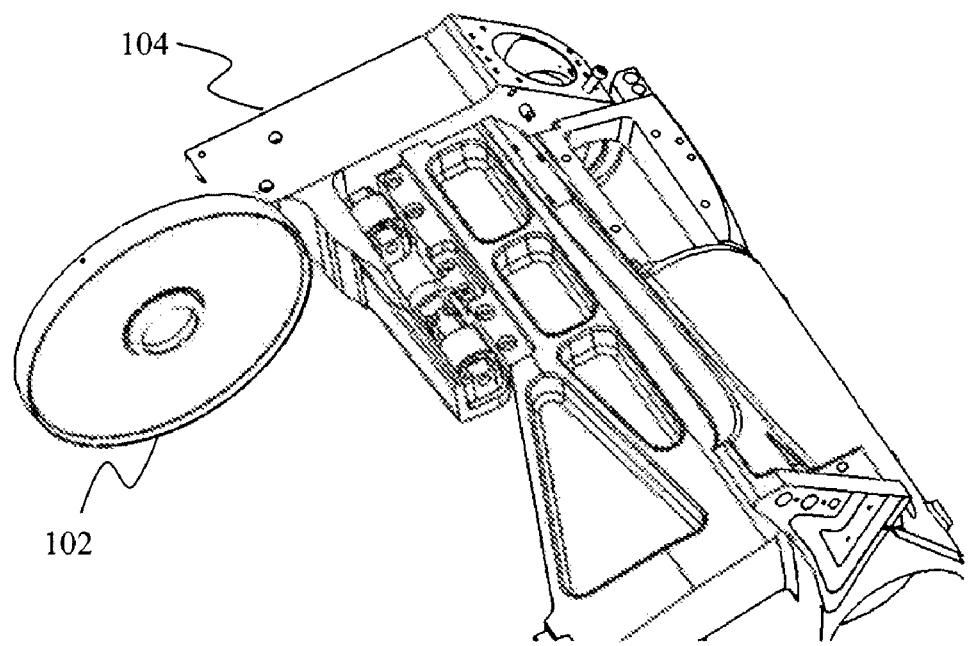
FIGS. 1A and 1B illustrate a prior art technique of mounting and positioning an optical element.
Figure 1B:
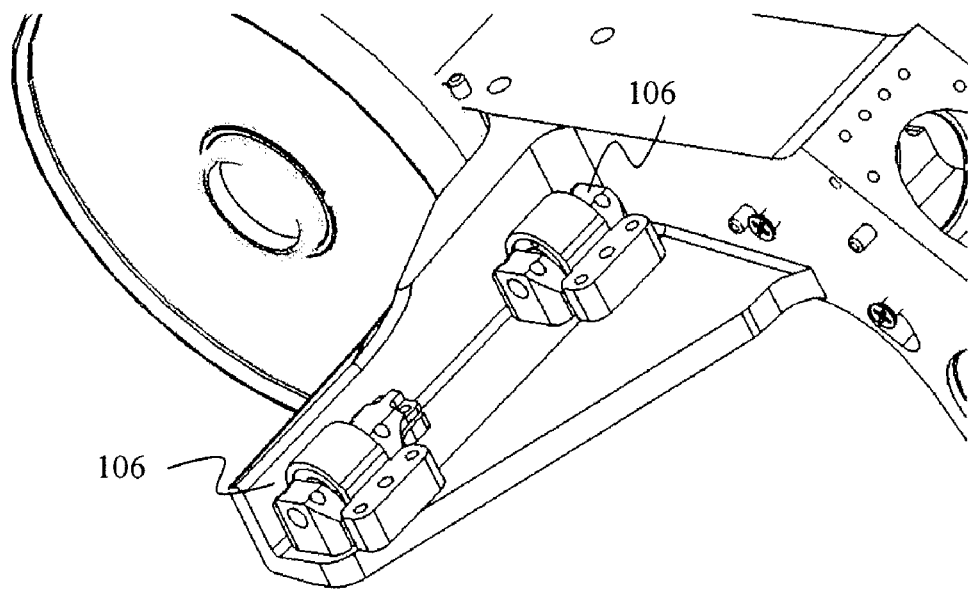

Another advantage of the invention, which should also become even more apparent from the descriptions below, is that rigid arm 202 can have a significantly larger cross section near the axis of rotation without obscuring the field of view of the optical sensor. To achieve equivalent stiffness with a typical hinged assembly, the cross section of the secondary arm would need to be much larger and would thus obscure the optical field of view and significantly increase the weight of the secondary arm. As shown in FIGS. 1A and 1B, increasing the size of the structure along the hinge axis adds material near the secondary mirror 102, which will obscure the field of view. Meanwhile, the kinematic mount plates 210 and 212 can both have significant cross section but the material is largest at the farthest distance from the mirror 204, thus minimizing obscuration.

In one preferred example, to achieve high performance for an optical sensor in adverse environments, the structure must be very stiff. The kinematic mounting techniques according to the invention are herein applied to a movable secondary mirror mounting structure to provide deterministic alignment over multiple positions with excellent dynamic performance.

Figure 3:
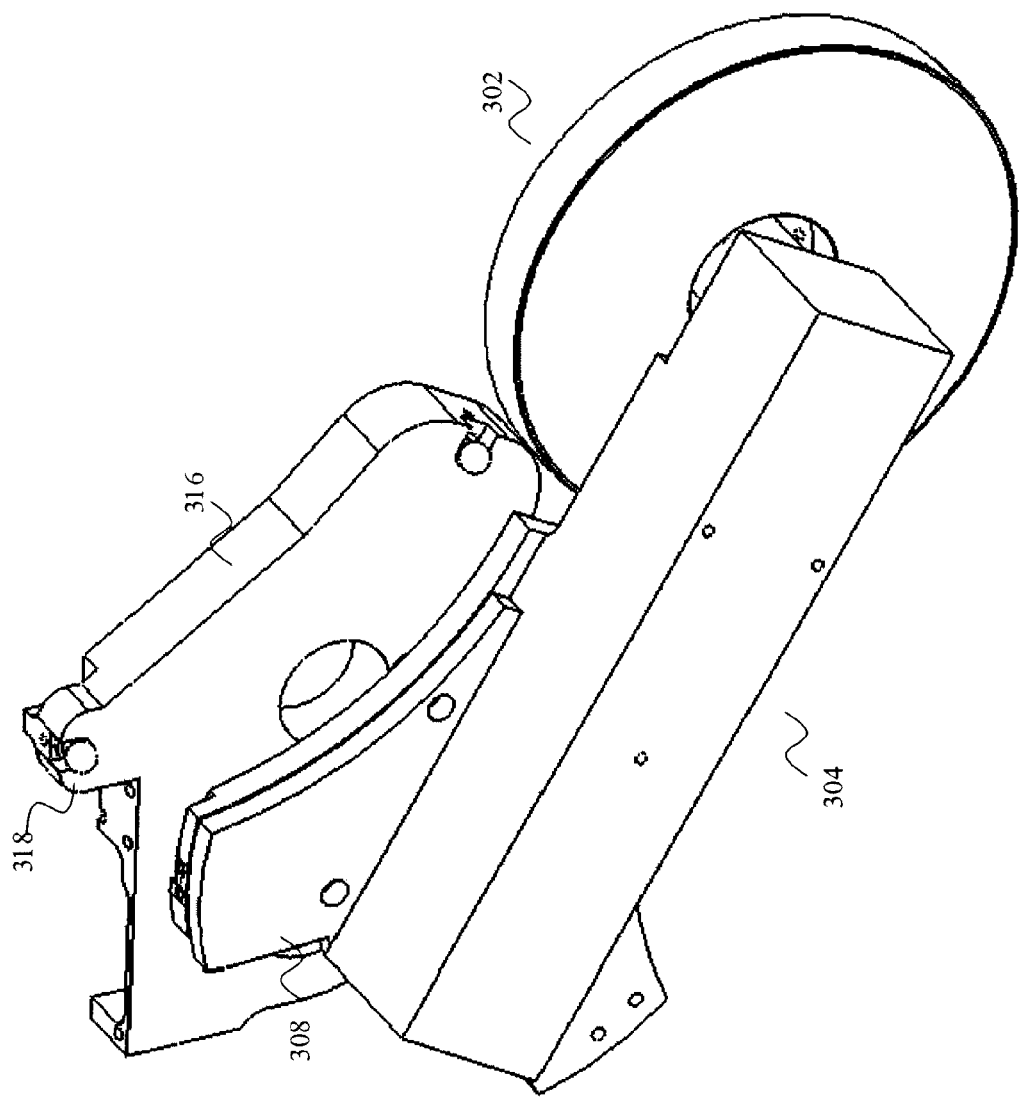
FIGS. 3 to 5 are respective views of an example kinematic positioning structure according to certain aspects of the invention.
Figure 4:
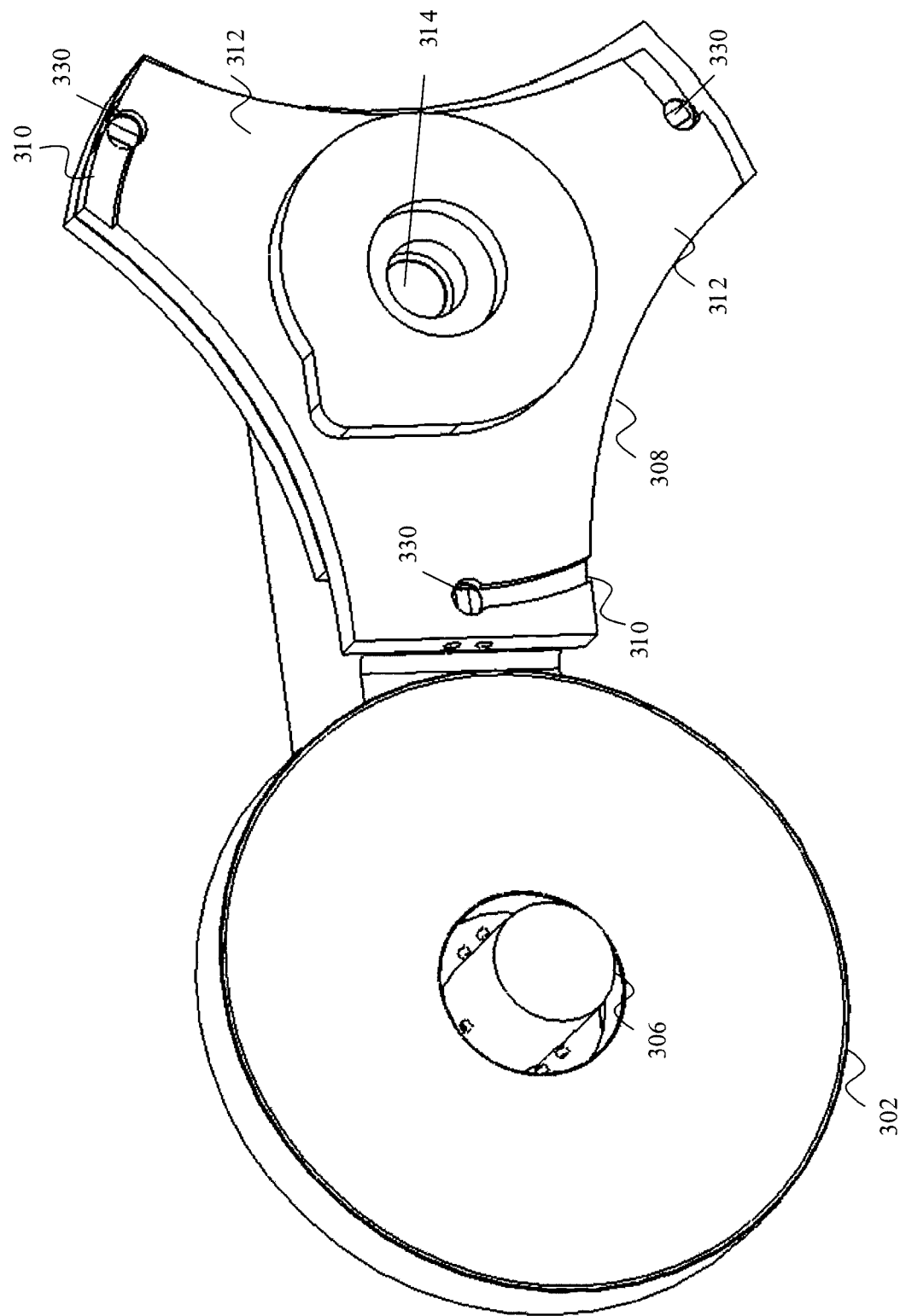
Figure 5:
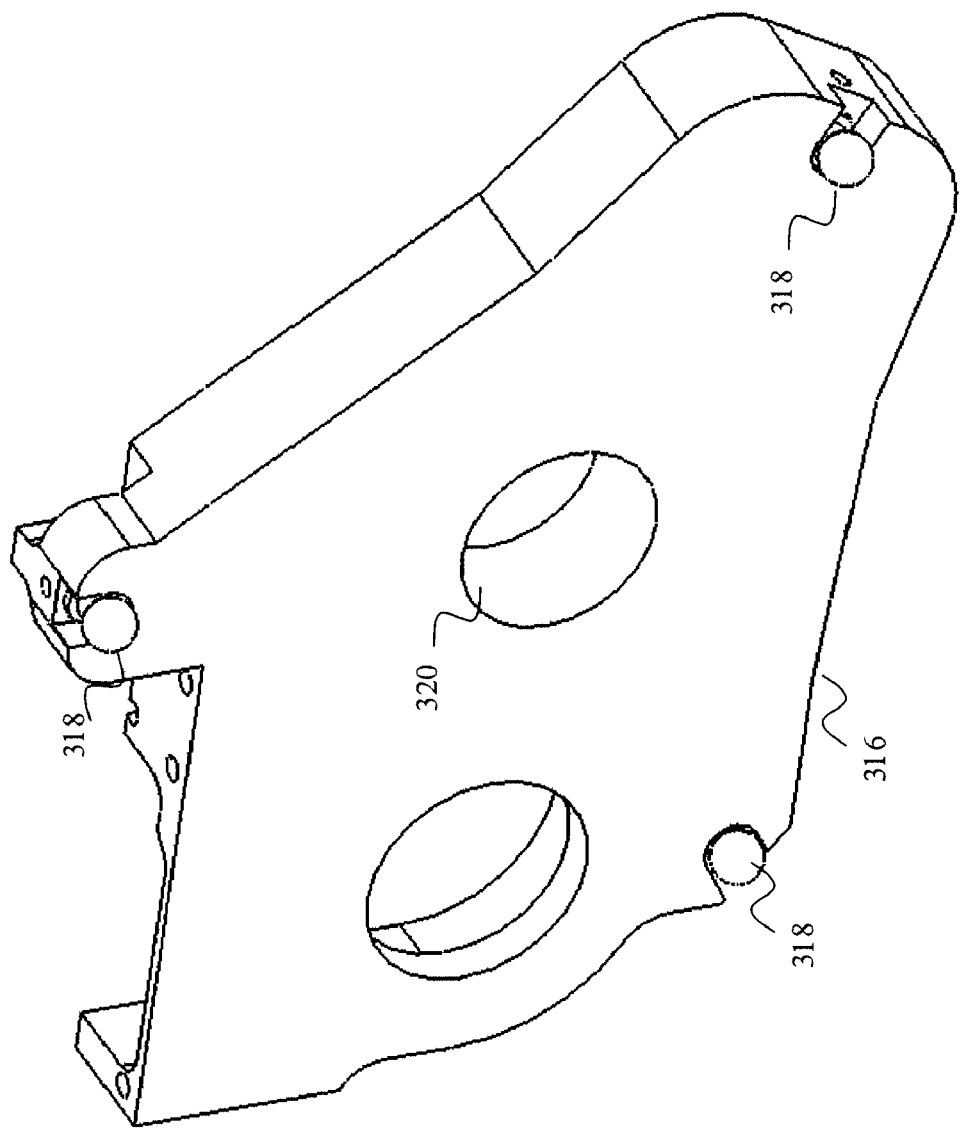

An example of this implementation of the invention is illustrated in FIGS. 3-5.

As shown in FIG. 3, an optical element in this example is a secondary mirror 302. Mirror 302 is comprised of glass, having a circular shape and about 5 in. in diameter, and weighing about 1 lb. Such a mirror 302 can be used in an optical system as a Cassegrain mirror for a telescope. Such an optical system can be included in the payload of a gimbal or other sensor system. Such systems can be subject to extreme environmental and vibrational conditions, and for which the present invention provides superior performance to conventional mounting techniques. However, the invention is not limited to this example application, and an analysis for modifying this example for various applications will be described below.

As further shown in FIG. 4, mirror 302 is mounted to a secondary arm 304 having a hub 306. A mount such as that described in co-pending application Ser. No. 11/382,456, the contents of which are incorporated herein by reference, can be used to mount mirror 302 to hub 306. Secondary arm 304 is about 7 in. long with a rectangular cross section with sides that are about 2 in. wide and 2 in. tall. The secondary arm can be made of aluminum or other material with a high specific stiffness, critical to achieving optical stability in dynamic environments.

Returning to FIG. 3, secondary arm 304 is further attached to kinematic plate 308 (which can correspond to mounting plate 212 in FIG. 2). In embodiments, plate 308 is comprised of aluminum or other high specific stiffness material and is about 0.5 in. thick. As shown in FIG. 4, plate 308 includes three grooves 310 respectively positioned 120 degrees apart on respective radial arms 312. In one example, V-shaped features 330 located at the end of grooves 310 are approximately 0.200 in. deep, 0.200 in. wide and 0.500 in. long. The V-shaped 330 features align radially and intersect at the rotational axis of the plate 308.

Referring back to FIG. 3, plate 308 couples to housing 316 (which can correspond to housing plate 210 in FIG. 2). As further illustrated in FIG. 5, housing 316 in one example is comprised of aluminum or other high specific stiffness material about 0.5 in. thick. Housing 316 includes three kinematic balls 318, which are spheres comprised of stainless steel and about 0.25 in. in diameter. The three kinematic balls are located 120 degrees apart on the perimeter of a circle with a radius of about 2 inches. The center of the circle coincides with the center of hole 320. Hole 320 is a clearance hole for the secondary arm actuator (not shown). The center line of the hole is coincident with the rotational axis of plate 308 and the center of the circle that the kinematic balls reside on.

In embodiments, housing 316 is coupled to a vehicle such as an aircraft, etc.

It should be apparent that different dimensions and/or materials can be substituted for the above described elements based on the particular application, and those skilled in the art will be able to practice the invention in such applications after being taught by the examples provided herein. It should be further apparent that the actual number, size and shape of grooves 310/balls 318/features 330 used in a particular application can also be designed for a given application based on the present teachings. It should be noted, moreover, that it is not necessary for there to be the same number of grooves/balls, nor that they be placed in the manner shown in the figure. The invention may be practiced in various ways using various types and configurations of mated kinematic components such as grooves 310/balls 318.

As can be appreciated from the drawings, the three balls 318 on the housing 316 are dimensioned and arranged to mate to the three tapered grooves 310 on the movable secondary arm structure 304. More particularly, the balls 318 and features 330 are dimensioned and arranged such that when the balls 318 are seated in the features 330, the plates 308 and 318 are substantially flush against each other and relative rotation between the two is substantially prevented. This provides the deterministic positioning that allows accurate alignment of secondary mirror 302.

In accordance with other aspects, the balls 318 and grooves 310/features 330 are positioned to provide the widest base while minimizing optical obscuration. At one possible extreme, the radial arms 312 could be spokes with a minimal cross section. At another extreme, the balls and grooves could be mounted to solid circular disks as shown in FIGS. 2A-2D. The spoke design would minimize obscuration while the solid circular disk would maximize optical obscuration. Obscuration in certain embodiments can be traded against structural stiffness. The overall stiffness of the resulting structure is at least double that of a hinged structure.

According to still further aspects of the invention, no stops are required as in the prior art techniques, and thus positional accuracy is not dependent on the stiffness or positional stability of the stop. Relatedly, it should be further apparent that the precision of the actuation scheme will not limit the positional accuracy of the mated kinematic assembly and thus the alignment of mirror 302.

Figure 6B:
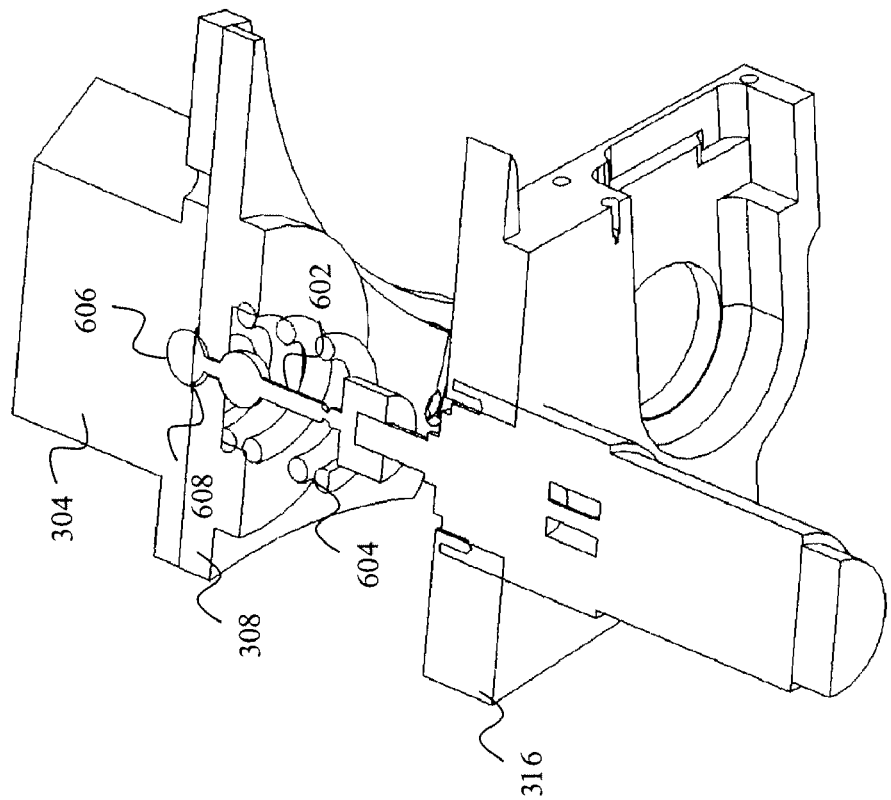
FIGS. 6A and 6B are alternative views of actuator structures that can be used with a kinematic positioning structure according to aspects of the invention.
Figure 6A:
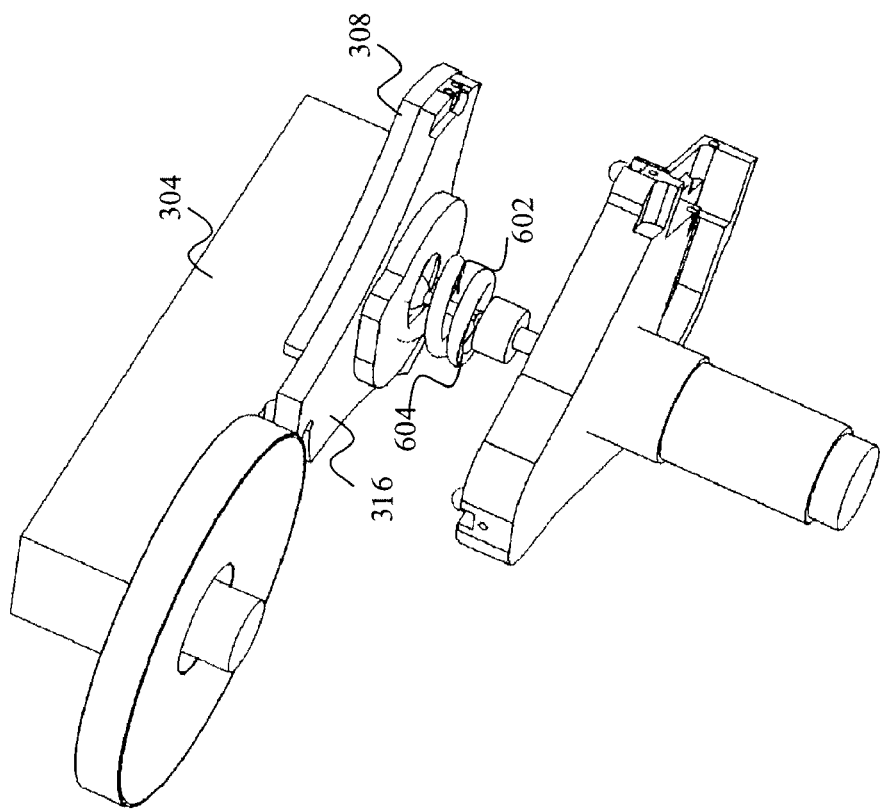

These and other aspects of the invention will become even more apparent from FIGS. 6A and 6B. As shown in FIG. 6A, a tension element 602 is coupled to an actuator mechanism such as a motor and both plate 308 and arm assembly 304. The tension element restricts motion along the axis of rotation but allows some positional variation in the plane perpendicular to the axis of rotation. This feature reduces positional dependency between the actuator and the arm 304. As further shown in FIG. 6B, which includes a cross sectional view of element 602, tension element 602 can be a thin rod having balls 606 and 608 that fit in corresponding sockets of plate 308 and arm assembly 304 as shown. In other embodiments, tension element 602 can include a compression spring with a loose fit, or a flexure. The spherical balls and sockets allow plates 308 and 316 to be coupled together at a common axis, while permitting relative rotation between them about that common axis.

The actuator can further include a motor or other means (not shown) that can drive relative rotation between plates 308 and 316, and thus allows the arm 304 and mirror 302 to be repositioned. However, according to aspects of the invention, the actuation scheme and stiffness is decoupled from the positional accuracy and overall stiffness of the system. In embodiments of the invention, to maintain alignment between the housing 316 to the plate 308, and thus the positional alignment of arm 304 and secondary mirror 302, the balls 318 need only be fully engaged in the features 330 of grooves 310 over all environmental conditions. As mentioned above, this condition is met by applying an axial preload between the two structures 316 and 308 in which the balls and cones are mounted. In this example, the axial preload can be achieved by the compression of spring 604. In other examples, the preload can be achieved by actuating a solenoid for example. The axial preload is calculated using a free body diagram to account for worst case environmental loads at different gravitational orientation, friction at the mating surfaces of the balls and tapered grooves, and actuator variations. The minimum axial preload at the maximum applied external load preferably will always keep the mating features fully engaged.

Accordingly, these embodiments include simply applying an axial preload (through spring 604) to the secondary arm structure to keep the balls 318 in contact with the tapered grooves 310 and seated in features 330. This allows actuator stiffness to be decoupled from arm stiffness and positional accuracy of the actuator to be decoupled from positional accuracy of the arm. Simply applying an axial preload allows the mating kinematic features to remain engaged, and positional accuracy to be achieved.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A mounting apparatus comprising:
   an arm structure;
   a housing structure that is rigidly affixed to a platform, wherein the arm structure and housing structure share a common axis for relative rotation between the arm structure and housing structure; and
   a plurality of mutually engaging mechanisms integrally formed in the arm structure and housing structure at respective predetermined locations with respect to the common axis, wherein the plurality of mutually engaging mechanisms allow the arm structure and housing structure to be engaged with each other at a respective plurality of predetermined positions of relative rotation therebetween.

2. An apparatus according to claim 1, wherein the housing structure and arm structure have respective surfaces that are substantially flush with each other when the structures are engaged via the mutually engaging mechanisms.

3. An apparatus according to claim 1, wherein the mutually engaging mechanisms comprise tapered features formed in one of the arm structure and housing structure, and balls that are adapted to travel in and seat in the tapered features that are formed in the other of the arm structure and housing structure.

4. An apparatus according to claim 1, further comprising a rigid arm that is affixed to the arm structure and includes a rigid mount for a sensor element.

5. An apparatus according to claim 4, wherein the sensor element is a secondary mirror for an optical sensor.

6. An apparatus according to claim 5, wherein the predetermined plurality of positions correspond to a predetermined plurality of alignments for the optical sensor.

7. An apparatus according to claim 1, wherein the arm structure includes respective radial arms that extend from the common axis to one of the mutually engaging mechanisms.

8. An apparatus according to claim 1, further comprising an axial preload mechanism that draws the housing structure and arm structure toward each other along a direction of the common axis.

9. An apparatus according to claim 8, wherein the axial preload mechanism comprises a spring.

10. A method of mounting an object to a platform comprising:
    coupling the object to an arm structure;
    rigidly affixing a housing structure to a platform;
    arranging the arm structure and housing structure so that they share a common axis for relative rotation between the arm structure and housing structure; and
    providing a plurality of mutually engaging mechanisms in the arm structure and housing structure at respective predetermined locations with respect to the common axis,
    wherein the plurality of mutually engaging mechanisms allow the arm structure and housing structure to be engaged with each other at a respective plurality of predetermined positions of relative rotation therebetween.

11. A method according to claim 10, wherein the housing structure and arm structure have respective surfaces that are substantially flush with each other when the structures are engaged via the mutually engaging mechanisms.

12. A method according to claim 10, wherein the mutually engaging mechanisms comprise tapered features formed in one of the arm structure and housing structure, and balls that are adapted to travel in and seat in the tapered features that are formed in the other of the arm structure and housing structure.

13. A method according to claim 10, wherein the object comprises a sensor element, the method further comprising:
    affixing a rigid arm to the arm structure;
    attaching a rigid mount for the sensor element.

14. A method according to claim 13, wherein the sensor element is a secondary mirror for an optical sensor.

15. A method according to claim 14, wherein the predetermined plurality of positions correspond to a predetermined plurality of alignments for the optical sensor.

16. A method according to claim 10, wherein the arm structure includes respective radial arms that extend from the common axis to one of the mutually engaging mechanisms.

17. A method according to claim 10, further comprising:
    coupling an axial preload mechanism to the arm structure and housing structure that draws the housing structure and arm structure toward each other along a direction of the common axis.

18. A method according to claim 17, wherein the axial preload mechanism comprises a spring.

* * * * *